: 3,506,664
Patented Apr. 14, 1970

3,506,664
PREPARATION OF POLYBROMINATED 2-PYRIMIDINEACETONITRILES
George A. Burk, Bay City, Mich., assignor to The Dow Chemical Company, Midland, Mich., a corporation of Delaware
No Drawing. Filed Feb. 13, 1968, Ser. No. 705,002
Int. Cl. C07d 51/36
U.S. Cl. 260—251                    7 Claims

ABSTRACT OF THE DISCLOSURE

Polybrominated 2-pyrimidineacetonitriles are obtained as the major product when malononitrile is reacted with bromine at moderate temperatures. Small amounts of brominated malononitrile and other products are also formed. The polybrominated pyrimidineacetonitriles are active bactericides and fungicides.

BACKGROUND OF THE INVENTION

The present invention concerns a new chemical process and new chemical compounds thereby produced. It concerns particularly a process wherein an aliphatic nitrile is simultaneously brominated and cyclized to produce a brominated heterocyclic product.

Pyrimidine and substituted pyrimidines are usually obtained through multi-step and time-consuming syntheses. Since compounds having this heterocyclic nucleus are of particular interest because of their pronounced biological activity, it would be desirable to have available a simplified method whereby such compounds could be obtained more conveniently.

SUMMARY OF THE INVENTION

It has now been found that the major product obtained when malononitrile is reacted with bromine at moderate temperatures is not a brominated malononitrile which would normally be expected, but is a product of cyclization, namely, a polybrominated 2-pyrimidineacetonitrile the formula

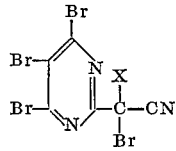

wherein X is hydrogen or bromine depending upon the proportion of bromine used in the reaction. This result is obtained at bromination temperatures in the range of about 30° C. to about 100° C. Above about 100° C., decomposition reactions predominate and little if any useful compound is obtainable from the reaction mixture. Little or no reaction occurs below about 30° C.

DETAILED DESCRIPTION

The process can be run successfully in the absence of a solvent, but an inert solvent is preferably employed for more convenient practical operation. Any organic solvent which is essentially unreactive with bromine under process conditions can be used. Preferably, a hydrocarbon or halogenated hydrocarbon having a boiling point within the process temperature range is employed. Chlorinated methanes and ethanes are illustrative examples.

Bromine is used in about 0.5–2 molar proportions based on the malononitrile, depending on the stage of bromination desired. Preferably, about 0.8–1.2 moles of bromine per mole of nitrile is employed to make the tetrabromo-pyrimidineacetonitrile while 1.5–2 moles of bromine yields the pentabromo compound as the main product.

Relatively small amounts of brominated malononitrile and corresponding amides are also found in the reaction mixture, the amides being formed apparently by hydrolysis caused by traces of moisture in the mixture. The reaction is preferably caried out in the substantial absence of water to minimize such hydrolysis. However, traces of water can be present without serious loss of yield or quality of product. Ammonium bromide and related compounds are byproducts of the reaction.

The reaction is preferably run by adding bromine to a solution of malononitrile at 40–90° C. and at a rate such that the exothermic reaction supplies enough heat to maintain the mixture at its reflux temperature, thereby providing a convenient means of temperature control.

Surprisingly, similar reactions carried out using chlorine as the halogen reactant appear to yield only chlorinated malononitrile and amide derivatives thereof depending upon the extent of exposure to moisture. No pyrimidine products are found in any significant amount.

The brominated pyrimidineacetonitriles made by this process are very active bactericides and fungicides. Microbial organisms such as *Cercosphora beticola*, *Staph. aureus*, and *Trichophyton mentagrophytes* are killed or their growth effectively inhibited by applying to them or their habitat an aqeuous solution or suspension containing a concentration of as little as 100 parts per million of either the tetrabromo pyrimidineacetonitrile or the pentabromo compound.

EXAMPLE I

A solution of 66 g. of malononitrile in 250 ml. of methylene chloride was stirred at reflux temperature (42° C.) while 160 g. of bromine was added dropwise over a period of one hour. The reaction mixture was filtered to remove a powdery water-soluble solid, largely ammonium bromide, and the filtrate was evaporated to obtain 200 g. of yellow solid. This was washed with water and recrystallized from benzene to yield yellow crystals of α,4,5,6-tetrabromo-2-pyrimidineacetonitrile, M.P. 155–156° C., in 50 percent yield based on the starting malononitrile. The identity of the product was established by elemental analysis and infrared spectroscopic examination. A lesser yield of bromocyanoacetamide was separated from the water wash.

When the procedure of Example I was repeated using 350 ml. of ethylene dibromide as the solvent and carrying out the bromination at 120–134° C., a small amount of bromomalononitrile was separated from the highly colored reaction mixture but no recoverable quantity of brominated pyrimidineacetonitrile was found.

EXAMPLE II

By the general procedure of Example I, 106 g. of bromine was added to a solution of 45 g. of malononitrile in 200 ml. of carbon tetrachloride at about 76° C. at a rate sufficient to maintain reflux of the solvent from the heat of reaction. Addition time was 20 minutes. The reaction mixture was worked up as before to obtain about forty per cent of the theoretical quantity of α,4,5,6-tetrabromo-2-pyrimidineacetonitrile based on the malononitrile as an essentially pure compound recrystallized from cyclohexane. Bromocyanoacetamide was obtained in about ten per cent yield.

EXAMPLE III

Example I was repeated except for using double the quantity of bromine (2 moles per mole of malononitrile) which was added over a 2 hour period. About 34 g. of unreacted bromine was present in the final reaction mixture. By working up the product essentially as in Example I, there was obtained a 73 percent yield based on reacted bromine, of green solid identified by infrared absorption analysis and mass spectroscopy as crude α,α,4,5,6-pentabromo-2-pyrimidineacetonitrile. Purification by extraction with ether gave a material melting at 158–160° C. Identity of the product was confirmed by elemental analysis of a sample recrystallized from benzene.

Examples IV and V illustrate the lowered yield of brominated pyrimidine obtained when less bromine is employed and also the lowered quality of product caused by increased exposure to moisture.

EXAMPLE IV

A solution of 66 g. (1 mole) of malononitrile in 400 ml. of carbon tetrachloride, dry distilled analytical grade, was stirred at its reflux temperature, 74° C., while 109 g. (0.68 mole) of bromine was added dropwise in 30 minutes. No bromine or HBr vented from the reaction. The resulting reaction mixture was filtered to separate 15 g. of insoluble solid identified as ammonium bromide.

Part of the carbon tetrachloride was evaporated from the filtered mixture, whereupon two liquid phases formed. The top layer was separated and the solvent was evaporated to yield 68 g. of solids identified as largely a mixture of malononitrile and bromomalononitrile with a little bromocyanoacetamide. Evaporation of the solvent from the lower layer left 69 g. of light grey powder as a residue. This product was found to be slightly impure α,4,5,6-tetrabromo-2-pyrimidineacetonitrile.

EXAMPLE V

A procedure similar to that of Example IV was employed using as the solvent a technical grade of methylene chloride which contained a small amount of dissolved water. A solution of 62 g. (0.94 mole) of malononitrile in 250 ml. of the wet methylene chloride was stirred at its reflux temperature while 97 g. (0.606 mole) of bromine was added in 30 minutes. The reaction mixture was worked up as in Example IV to obtain 20 g. of ammonium bromide, 36 g. of solids from the resulting top layer which was essentially bromocyanoacetamide, and 63 g. of solids from the bottom layer which was a mixture containing about 80% of α,4,5,6-tetrabromo-2-pyrimidineacetonitrile.

I claim:
1. A process for making a compound of the formula

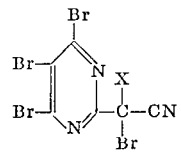

wherein X is hydrogen or bromine which comprises intimately contacting malononitrile with about 0.5 to about 2 moles of bromine at a temperature of about 30–100° C. in the substantial absence of water.

2. The process of claim 1 wherein malononitrile is contacted with 0.8–1.2 moles of bromine to produce α3,4,5-tetrabromo-2-pyrimidineacetonitrile.

3. The process of claim 1 wherein malononitrile is contacted with about 1.5–2 moles of bromine to produce α,α,3,4,5-pentabromo-2-pyrimideactonitrile.

4. The process of claim 1 wherein the bromination reaction is carried out in an inert solvent medium.

5. A compound of the formula

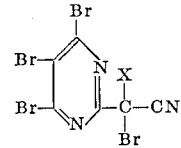

wherein X is hydrogen or bromine.
6. The compound of claim 5 wherein X is hydrogen.
7. The compound of claim 5 wherein X is bromine.

References Cited

UNITED STATES PATENTS 3,404,159  10/1968  Strobel et al. _____ 260—329

ALEX MAZEL, Primary Examiner

R. V. RUSH, Assistant Examiner

U.S. Cl. X.R.

424—251